United States Patent [19]

Matsumoto

[11] Patent Number: 4,738,885
[45] Date of Patent: Apr. 19, 1988

[54] MAGNETIC DISK, SUBSTRATE THEREFOR AND PROCESS FOR PREPARATION THEREOF

[75] Inventor: Takeshi Matsumoto, Kagoshima, Japan

[73] Assignee: Kyocera Corporation, Kyoto, Japan

[21] Appl. No.: 832,137

[22] Filed: Feb. 24, 1986

[51] Int. Cl.⁴ .................. G11B 5/704; G11B 5/82
[52] U.S. Cl. ........................... 428/64; 264/62; 264/65; 264/66; 360/135; 427/129; 427/292; 428/694; 428/900; 428/141
[58] Field of Search ............... 428/64, 65, 694, 900, 428/141; 427/129, 292; 264/56, 66, 62, 65; 360/135

[56] References Cited

U.S. PATENT DOCUMENTS

| | | | |
|---|---|---|---|
| 4,128,691 | 12/1978 | Shirahata et al. | 427/129 |
| 4,272,500 | 6/1981 | Eggerding et al. | 264/56 |
| 4,340,436 | 7/1982 | Dubetsky et al. | 264/65 |
| 4,411,963 | 10/1983 | Aine | 427/137 |
| 4,569,822 | 2/1986 | Brown et al. | 360/135 |
| 4,582,681 | 4/1986 | Asari et al. | 264/66 |

Primary Examiner—Paul J. Thibodeau
Attorney, Agent, or Firm—Spensley Horn Jubas & Lubitz

[57] ABSTRACT

Disclosed is a substrate for a magnetic disk, which comprises a ceramic substrate formed by subjecting a ceramic molded body to hot isostatic pressing in an inert atmosphere and subsequently to polishing treatment. In this magnetic disk substrate, the number of void defects is greatly reduced, and the substrate per se is excellent in the heat resistance and deformation resistance. If this substrate is used, there is provided a magnetic recording disk of a high reliability where recording can be performed at a high density with precise writing and reading.

15 Claims, 2 Drawing Sheets

MAGNETIC DISK, SUBSTRATE THEREFOR AND PROCESS FOR PREPARATION THEREOF

BACKGROUND OF THE INVENTION

(1) Field of the Invention

The present invention relates to a magnetic recording disk and a ceramic substrate therefor. More particularly, the present invention relates to a ceramic substrate for a magnetic disk, which has no void defects on the surface and is excellent in the heat resistance, dimension stability and deformation resistance. Furthermore, the present invention relates to a process for the preparation of this ceramic substrate.

(2) Description of the Prior Art

A magnetic disk device plays an important role in the storing of information in a data processing system of a computer. In order to cope with a recent desire to increase the density and capacity in the magnetic recording, by utilizing a film-forming technique such as sputtering, the thickness of a magnetic recording medium is reduced, and the ratio of utilization of the area of a substrate is increased.

An aluminum alloy is used for the substrate on which a magnetic recording medium as mentioned above is formed, and an alumite layer having a thickness of 2 to 15 $\mu$m, which is obtained by oxidizing the surface of the alloy, covers the surface of the substrate. Although the hardness of the surface of the substrate is increased by the presence of this alumite layer, since the thickness of the hard alumite layer is small and the thermal expansion coefficient of the aluminum alloy is different from that of alumite, distortion is readily caused as the substrate temperature arises. Namely, when a magnetic recording medium is formed on the substrate by sputtering, since the substrate is bombarded with sputtering particles or electrons, the temperature of the substrate is elevated by this bombardment energy. Furthermore, in case of a magnetic recording medium formed of $\gamma$-$Fe_2O_3$, a heat treatment is ordinarily carried out at a temperature higher than 300° C. If the substrate undergoes such elevation of the temperature, distortion is readily caused in the aluminum substrate. Therefore, when a magnetic recording medium is formed on this aluminum substrate and is used for high-density magnetic recording, precise writing or reading is difficult.

In a magnetic disk device, a plurality of magnetic disks are arranged on the same rotation axis, and data processing such as writing or reading is carried out by rotating these disks at 1000 to 3000 rpm. If the disk substrate is formed of an aluminum alloy, the substrate per se is readily elongated by a centrifugal force. Also because of this elongation, it becomes difficult to perform precise writing or reading suitable for high-density magnetic recording. Accordingly, elimination of such writing or reading errors is desired.

An aluminum alloy substrate for a magnetic disk is ordinarily covered with an alumite layer as described above, but there are often present voids having a diameter of about 5 $\mu$m at largest, and even an aluminum substrate having about ten voids is generally used. Accordingly, the conventional magnetic disk device for high-density recording is defective in that precise writing or reading is impossible because of the presence of such void defects. Therefore, development of a magnetic disk substrate having a reduced number of void defects is desired.

As another material for a disk substrate, plastics and glass have been examined. It is said that plastic materials are fatally defective in that the moisture permeability is high and glass materials are fatally defective in that glass is readily broken and the risk of damage by breaking is serious. Moreover, if a substrate formed of a plastic material is rotated at a high speed, since the Young's modulus of the plastic material is low, the substrate per se is readily elongated by a centrifugal force and the same problem as described above arises.

SUMMARY OF THE INVENTION

The present invention has been completed as the result of research made with a view to solving the foregoing problems involved in the conventional techniques. It is therefore a primary object of the present invention to provide a substrate for a magnetic disk, in which no distortion is caused in the substrate by the sputtering or heat treatment, the substrate is not elongated even by application of a centrifugal force, the number of voids on the surface of the substrate is reduced, and precise writing or reading suitable for high-density magnetic recording becomes possible.

More specifically, in accordance with one aspect of the present invention, there is provided a magnetic disk comprising a substrate and a magnetic recording medium layer formed on the surface of the substrate, wherein the substrate is a ceramic substrate having an average void diameter smaller than 1.5 $\mu$m, which is formed by subjecting a ceramic molded body to hot isostatic pressing and subsequent polishing treatment.

In accordance with another aspect of the present invention, there is provided a substrate for a magnetic disk, which comprises a ceramic substrate having an average void diameter smaller than 1.5 $\mu$m, which is formed by subjecting a ceramic molded body to hot isostatic pressing and subsequent polishing treatment.

In accordance with still another aspect of the present invention, there is provided a process for the preparation of a substrate for a magnetic disk, which comprises forming a powder mixture comprising a starting ceramic powder and a sintering aid or stabilizer into a disk, preliminarily calcining the formed body, subjecting the obtained pre-sintered body to hot isostatic pressing in an inert atmosphere and subjecting the obtained ceramic substrate to polishing treatment.

DETAILED DESCRIPTION OF THE PREFERRED EMBODIMENTS

Figure 1A:
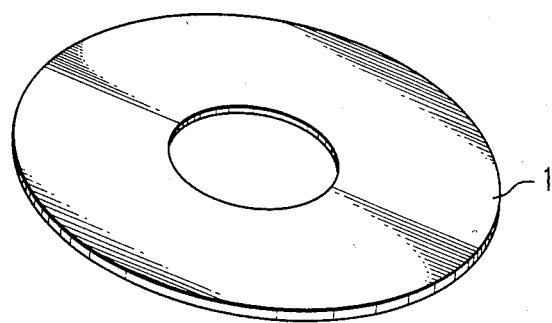
FIG. 1a is a diagram showing a substrate 1.
Figure 1B:
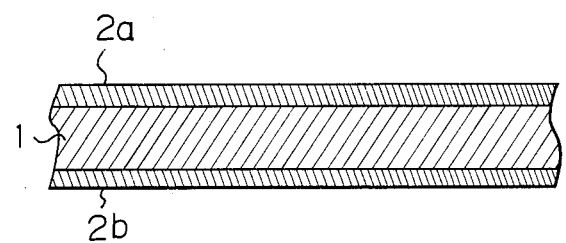
FIG. 1b is a sectional view showing a part of the substrate 1 having magnetic recording medium layers 2a and 2b formed on both the surfaces thereof.

Referring to FIG. 1 illustrating an example of the magnetic disk, known magnetic recording medium layers 2a and 2b are formed on both the surfaces of a substrate 1.

The present invention is characterized in that a sintered ceramic substrate having an average void diameter smaller than 1.5 μm, which is formed by subjecting a ceramic molded body to hot isostatic pressing (HIP treatment) and subsequent polishing treatment, is used as the substrate 1.

In a magnetic disk, especially a hard type magnetic disk, in order to realize high-density recording, it is required that the magnetic recording medium should be used in the form of a continuous film, and since there is a relation of a reverse proportion between the rising quantity of the head and the linear recording density at the magnetic recording, it is required that the rising quantity of the head should be minized.

As means for satisfying the former requirement, there can be mentioned a method in which a magnetic film is deposited on a substrate by sputtering or plating. However, if the above-mentioned aluminum substrate is used, there arises a problem of interlaminar electrochemical corrosion, and when the sputtering technique is adopted, there arises the above-mentioned problem of the heat resistance.

According to the present invention, by using the sintered ceramic substrate as the substrate for a magnetic disk, interlaminar electrochemical corrosion is prevented and the problem of the heat resistance at the film-forming step is solved, and furthermore, deformation of the magnetic disk can be prevented at the time of driving the disk.

When a sintered ceramic substrate is used as the substrate for a magnetic disk, there inevitably arises a problem of formation of voids. The voids generally have a diameter of 1 to 20 μm and the number of voids per unit area is, for example, 800 to 1000 per $8 \times 10^5$ μm². When the sintered ceramic substrate is applied to ordinary uses, the presence of these voids does not cause any trouble. However, if a continuous magnetic film is formed on this substrate, since the thickness of the film is smaller than 0.5 μm, defects are formed on the film by the presence of such voids, or even if no defects are formed on the film, the distance between the head and the magnetic film is increased by the presence of the voids and the attainable linear recording density is drastically lowered.

According to the present invention, by subjecting the ceramic molded body to hot isostatic pressing (HIP treatment) and subsequent polishing treament, the number of voids per unit area of the polished surface can be greatly reduced, and if the particle size of the starting ceramic powder is limited as described hereinafter, the average void diameter can be controlled to less than 1.5 μm, especially less 1.0 μm, and the number of voids per unit area can be controlled to less than 10 per $8 \times 10^5$ μm², especially 4 per $8 \times 10^5$ μm².

Figure 3:
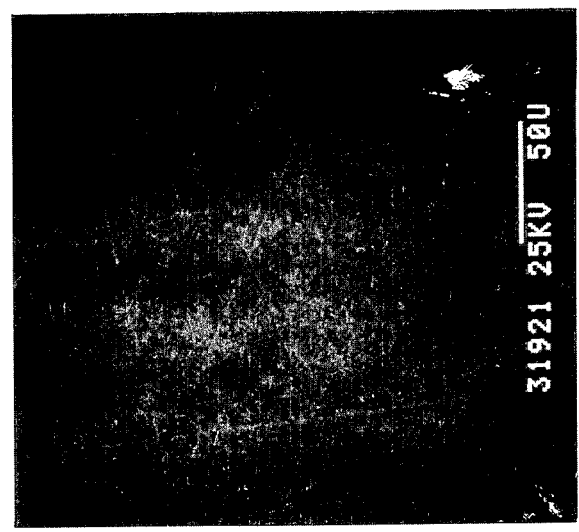
FIG. 3 is a metallurgical microscope photograph showing the surface state of a sintered alumina substrate which is subjected to hot isostatic pressing and subsequent polishing.
Figure 2:
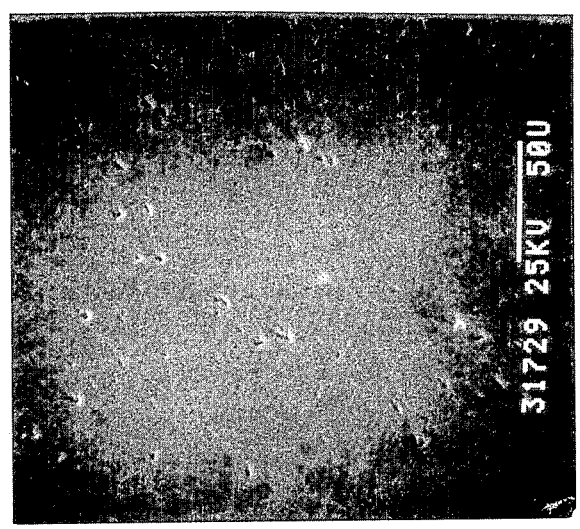
FIG. 2 is a metallurgical microscope photograph showing the surface state of a sintered alumina substrate which is subjected to polishing without hot isostatic pressing.

FIG. 2 is a metallurgical microscope photograph (400 magnifications) showing the polished surface of an ordinary alumina sintered body, and FIG. 3 is metallurgical microscope photograph (400 magnifications) showing the surface of this alumina sintered body after the HIP treatment and polishing treatment (sample 1 obtained in Example 2). If these photographs are compared with each other, it is seen that according to the present invention, by the HIP treatment, the average void diameter is greatly reduced and the number of voids per unit volume is controlled to a very small value.

Another advantage attained by the present invention is that by the above-mentioned HIP treatment and subsequent polishing treatment, the smoothness of the ceramic substrate can be prominently improved. More specifically, according to the present invention, the central line average roughness (Ra) of the surface of the ceramic substrate can be controlled to less than 0.03 μm, especially less than 0.01 μm.

Incidentally, the central line average roughness (Ra) means the average value of heights and depths of peaks and troughs from the average central line drawn on the roughness curve obtained by a surface roughness meter.

The ceramic substrate of the present invention is excellent in the surface smoothness and has a high hardness, as pointed out above, and even if the magnetic disk is rotated at such a high speed as 3000 to 4000 rpm, elongation by the centrifugal force or warping of the surface of the substrate is hardly caused. Accordingly, high-density recording can be performed while controlling the rising quantity of the head to less than 0.3 μm, especially less than 0.2 μm.

In the substrate for a magnetic disk according to the present invention, it is preferred that as determined according to Japanese Industrial Standard B-0621-1974, the planeness be less than 5 μm and the coaxial degree be less than 20 μm, especiallly less than 10 μm. Furthermore, it is preferred that the Vickers hardness Hv of the substrate be at least 1200 Kg/mm² and the thickness of the substrate be 0.8 to 2.0 mm.

For the preparation of the ceramic substrate for a magnetic disk according to the present invention, a powder mixture comprising a starting ceramic material and a sintering aid or a stabilizer is formed into a disk and the resulting molded body is preliminarily calcined. As the starting ceramic material, there can be mentioned oxide ceramics such as α-alumina, zirconia, mullite, forsterite and zircon, nitride ceramics such as silicon nitride, titanium nitride, aluminum nitride, boron nitride and Sialon, and carbide ceramics such as silicon carbide, titanium carbide, tungsten carbide and chromium carbide. These ceramics may be used singly or in the form of a mixture of two or more of them. If sintering is impossible when these ceramics are used singly or in the form of a mixture of two or more of them, an oxide, nitride, boride or carbide of an element selected from elements of groups IIa, IIIa and IV of the periodic table may be used as a sintering aid, and when a carbide type or nitride type ceramic is used, a metal of the group VIII of the periodic table may be used as a binder.

An organic binder or the like is added to the above-mentioned powder mixture, the mixture is molded into a disk by optional means such compression pressing, and pre-sintering is carried out under such temperature and time conditions that sintering of the ceramic powder is sufficiently caused. The pre-sintered body is subjected to hot isostatic pressing in an inert atmosphere such as nitrogen, argon or helium under a pressure of 1000 to 2000 atmospheres (gauge) at a ceramic-sintering temperature, ordinarily 1200° to 2000° C.

The obtained sintered body is subjected to a known polishing treatment such as lapping, polishing and final polishing using abrasive grains differing in the kind and size.

Instead of the method in which the pre-sintered body is subjected to the HIP treatment, there may be adopted a method in which the surface of an uncalcined ceramic molded body is coated with a slurry of a coating material which is molten at a temperature lower than the ceramic-sintering temperature, such as glass, the coating is then molten and densified, and the coated molded body is subjected to the HIP treatment. Furthermore, there may be adopted a method in which a film of a coating material is formed on the surface of a ceramic molded body by chemical vapor deposition and the coated molded body is subjected to the HIP treatment.

In the present invention, use of alumina ceramic is most advantageous from the economical viewpoint. Accordingly, the following concrete description will be made with reference to a sintered alumina body, though the present invention is not limited to this embodiment.

In order to obtain a substrate for a magnetic disk, which has a reduced average void diameter, according to the present invention, it is important that the primary average particle size and purity of the starting alumina material should be set within predetermined ranges. As the result of repetition of experiments by us, it has been found that if the HIP treatment is carried out by using a starting alumina powder having a primary average particle size smaller than 1 $\mu$m and a purity higher than 97%, the average void diameter on the surface of the substrate for a disk can be reduced below 1.5 $\mu$m, especially below 1.0 $\mu$m, though these factors are influenced to some extent according to other preparation conditions.

This starting alumina powder is sufficiently mixed with an organic binder such as a wax emulsion, PVA or PEG and a sintering aid such as $SiO_2$ or MgO, and the mixture is dried and granulated by a spray drier. Then, the granulated mixture is press-molded into a disk under a pressure of at least 0.6 kg/cm$^2$ and sintered for 2 to 6 hours in an atmosphere maintained at a temperature of 1450° to 1750° C. The sintered body is subjected to the HIP treatment for 0.5 to 3 hours at a temperature of 1300° to 1800° C. in a nitrogen or argon atmosphere.

The so-obtained HIP-treated sintered alumina body is much more transparent than the sintered alumina body before the HIP treatment. The HIP-treated sintered body is subjected to polishing treatment such as lapping, polishing and final polishing, whereby a substrate for a magnetic disk according to the present invention can be obtained.

A known magnetic recording medium is formed on the above-mentioned substrate, and means for forming a film of the magnetic recording medium is not particularly critical. In the present invention, however, it is preferred that a continuous film of the magnetic recording medium be formed by sputtering or plating.

As the magnetic material, there can be mentioned iron oxide type magnetic materials such as $\gamma$-$Fe_2O_3$ and Co-containing $\gamma$-$Fe_2O_3$, magnetic materials composed of at least one member selected from metals of the group VIII of the periodic table, such as Co-Ni and Fe-Co, and magnetic materials containing a metal of the group VIII of the periodic table and such an element as nitrogen, phosphorus, chromium, platinum, tungsten or rhenium, such as CoNi/Cr, CoNiPt, CoNiW, CoRe, CoCr, CoNiN, FeCoCr/Cr and CoNiP.

Various methods may be adopted for formation of a magnetic film of $\gamma$-$Fe_2O_3$. For example, there can be mentioned (i) a method in which sputtering is carried out on an alumina substrate in an atmosphere containing argon and oxygen by using $\alpha$-Fe as the target, the formed $\alpha$-$Fe_2O_3$ film is reduced to $Fe_3O_4$ with hydrogen and oxidation is carried out by a heat treatment in air to form a continuous film of $\gamma$-$Fe_2O_3$, (ii) a method in which sputtering is carried out on an alumina substrate in an argon atmosphere by using triiron tetroxide as the target and the formed film is heat-treated in air to form $\gamma$-$Fe_2O_3$, (iii) a method in which sputtering is carried out in an atmosphere containing argon and hydrogen by using $\alpha$-$Fe_2O_3$ as the target and the formed film is heat-treated in air to form a $\gamma$-$Fe_{2/O3}$ film and (iv) sputtering is carried out in an atmosphere containing argon and oxygen by using $\gamma$-Fe as the target to form a film of $Fe_3O_4$ and this film is heat-treated in air to form a film of $\gamma$-$Fe_2O_3$.

Furthermore, there may be adopted a method in which sputtering is carried out on an alumina substrate by using an alloy as mentioned above as the target in an argon atmosphere to form a film of the alloy.

In the present invention, it is preferred that the thickness of the magnetic film be smaller than 0.5 $\mu$m, especially 0.04 to 0.3 $\mu$m. A magnetic film free of defects and excellent in the adhesion and electrochemical corrosion resistance can be formed without performing any particular preliminary treatment on the ceramic substrate.

When a magnetic film is formed by plating, an alloy as mentioned above is deposited on the ceramic substrate by electroless plating or electrolytic plating.

A protecting film of carbon or $SiO_2$ may be formed on the magnetic film formed by plating or sputtering, and a solid lubricant may be applied onto this protecting film by such coating means as spin-coating.

The present invention will now be described in detail with reference to the following examples that by no means limit the scope of the invention.

EXAMPLE 1

Alumina powder (having a primary average particle size of 0.6 $\mu$m and a purity of 99.7%) was mixed with 0.2% by weight of MgO as the sintering aid together with an organic binder, and after milling, the mixture was dried and granulated by a spray drier. The resulting granular mixture was molded into a doughnut-like disk (having an outer diameter of 114 mm, an inner diameter of 30 mm and a thickness of 2.4 mm) by a hydraulic press (having a pressing pressure of 1.2 ton/cm$^2$). The molded body was sintered at 1600° C. for 3 hours to obtain a disk-shaped sintered body. Then, the sintered body was subjected to the HIP treatment at 1500° C. for 1 hour under a pressure of 2000 atmospheres in an argon atmosphere to obtain a substrate for a magnetic disk (having an outer diameter of 95 mm, an inner diameter of 25 mm and a thickness of 2 mm).

The substrate was polished with a diamond abrasive (#220) to obtain a surface roughness of 3S to 6S. Then, the surface of the substrate was further polished by lapping and polishing to obtain a surface having a center line average roughness (Ra) of 0.01 $\mu$m.

With respect to the so-obtained magnetic disk substrate of the present invention, the average number of voids formed on one surface, the average ratio of the area occupied by the voids, the average void diameter and the maximum void diameter were measured by using an image analyzer. It was found that 55 voids were formed on one surface, the average ratio occupied by the voids was 0.002%, the average void diameter was 0.8 $\mu$m and the maximum void diameter was 1.2 $\mu$m. Accordingly, it is confirmed that this disk substrate is highly improved over a conventional aluminum substrate.

Furthermore, the disk substrate of the present invention has a Vickers hardness of 2100 kg/mm$^2$ and a flexural strength of 60 kg/mm$^2$ and is highly improved in the strength and hardness over the polycrystalline alumina disk substrate not subjected to the HIP treatment, which has a Vickers hardness of 1800 kg/mm$^2$ and a flexural strength of 33 kg/mm$^2$. When this disk substrate is rotated at a high speed, no warping is caused on the surface.

Reactive sputtering was carried out on the so-formed magnetic disk substrate of the present invention by using Co-containing Fe as the target to form a film of $\alpha$-Fe$_2$O$_3$ having a thickness of 0.2 $\mu$m. Then, reduction was carried out at 320° C. in a hydrogen atmosphere to convert the film to a $\gamma$-Fe$_2$O$_3$ film, whereby a disk for high-density magnetic recording was obtained. If the obtained magnetic disk was used for recording while adjusting the rising quantity of a head to 0.2 $\mu$m, the head did not impinge on the magnetic disk, and when a signal error was checked with respect to each of the disk and head, it was confirmed that high-density recording could be performed without any trouble.

EXAMPLE 2

An alumina disk substrate was prepared in the same manner as described in Example 1 except that the primary average particle size and purity of the starting alumina powder were changed as indicated in Table 1, and the average void number was measured. The obtained results are shown in Table 1.

TABLE 1

| Sample No. | Starting Alumina Powder | | Average Void Diameter ($\mu$m) |
|---|---|---|---|
| | Primary Average Particle Size ($\mu$m) | Purity (%) | |
| 1 | 0.4 | 99.7 | 0.5 |
| 2 | 0.7 | 99.7 | 0.8 |
| 3 | 0.8 | 99.7 | 1.1 |
| 4* | 1.3 | 99.7 | 1.7 |
| 5 | 0.6 | 98.0 | 1.0 |
| 6* | 0.6 | 94.9 | 1.8 |
| 7* | 1.3 | 94.9 | 2.4 |

Note
*outside the scope of the invention

As is apparent from Table 1, in samples 1 through 3 and 5, the average void diameter could be controlled below 1.5 $\mu$m because the alumina having the primary average particle size and purity included within the ranges specified in the present invention was used. On the other hand, in samples 4, 6 and 7 as comparative samples, the average void diameter was large and was close to the average void diameter of the conventional alumina substrate, and the intended object of the present invention could not be attained.

I claim:

1. A magnetic disk comprising a substrate and a magnetic recording medium layer formed on the surface of the substrate, wherein the substrate is a ceramic substrate having an average void diameter smaller than 1.0 $\mu$m and the number of voids per unit area is controlled to less than 10 per 8 $\times$ 10$^5$ $\mu$m$^2$, said substrate being formed by subjecting a ceramic molded body comprising $\alpha$-alumina having a primary average particle size smaller than 1 $\mu$m and a purity higher than 97% and a sintering aid to pre-sintering at a temperature of 1450° to 1750° C., a hot isostatic pressing carried out at a temperature of 1000° to 2000° C. under a pressure of 1000 to 2000 atmospheres (gauge) in an inert gas atmosphere and a subsequent polishing treatment.

2. A magnetic disk as set forth in claim 1, wherein the ceramic molded body is a molded body covered with a coating having a melting point lower than that of the ceramic.

3. A magnetic disk as set forth in claim 1, wherein the magnetic recording medium layer comprises an oxide of iron.

4. A magnetic disk as set forth in claim 1, wherein the central line average roughness (Ra) of the ceramic substrate is smaller than 0.1 $\mu$m.

5. A magnetic disk as set forth in claim 1, wherein the magnetic recording medium layer comprises a magnetic material formed of at least one metal selected from group VIII of the periodic table.

6. A magnetic disk as set forth in claim 1, wherein the magnetic recording medium layer comprises a magnetic material containing at least one metal selected from group VIII of the period table and at least one element selected from the group consisting of nitrogen, phosphorous, chromium, platinum, tungsten and rhenium.

7. A substrate for a magnetic disk, which comprises a ceramic substrate having an average void diameter smaller than 1.0 $\mu$m and the number of voids per unit area controlled to less than 10 per 8 $\times$ 10$^5$ $\mu$m$^2$, said ceramic substrate being formed by subjecting a ceramic molded body comprising $\alpha$-alumina having a primary average particle size smaller than 1 $\mu$m and purity higher than 97% and a sintering said to pre-sintering at a temperature of 1450° to 1750° C., hot isostatic pressing carried out at a temperature of 1000° to 2000° C. under a pressure of 1000 to 2000 atmospheres (gauge) in an inert gas atmosphere and a subsequent polishing treatment.

8. A process for making a magnetic disk, comprising the steps of:
    forming a starting alumina powder having a primary average particle size smaller than 1.0 $\mu$m and a purity higher than 97% and a sintering aid into a disk-shaped body;
    pre-sintering the disk-shaped body at a temperature of 1450° to 1750° C.;
    hot isostatic pressing the disk-shaped body at a temperature of 1000° to 2000° C. under a pressure of 1000 to 2000 atmospheres (gauge) in an inert atmosphere;
    polishing the surface of the hot pressed disk-shaped body to form a substrate having an average void diameter smaller than 1.0 $\mu$m and wherein the number of voids per unit area is controlled to less than 10 per 8 $\times$ 10$^5$ $\mu$m$^2$; and
    coating at least one side of said substrate with magnetic material.

9. A process as set forth in claim 8, wherein the magnetic material comprises an oxide of iron, a magnetic material formed of at least one member selected from metals of the group VIII of the periodic table, or a magnetic material containing at least one member selected from metals of the group VIII of the periodic table and at least one element selected from the group consisting of nitrogen, phosphorous, chromium, platinum, tungsten and rhenium.

10. A process as set forth in claim 8, wherein the magnetic recording medium layer comprises a magnetic material formed of at least one metal selected from group VIII of the periodic table.

11. A process as set forth in claim 8, wherein the magnetic recording medium layer comprises a magnetic material containing at least one metal selected from group VIII of the period table and at least one element selected from the group consisting of nitrogen, phosphorous, chromium, platinum, tungsten and rhenium.

12. A process as set forth in claim 8, wherein the central line average roughness (Ra) of the ceramic substrate is smaller than 0.1 μm.

13. A process for the preparation of a substrate for a magnetic disk, which comprises the steps of:

forming into a disk a powder mixture comprising a starting alumina powder having a primary average particle size smaller than 1 μm and a purity higher than 97%, and a sintering aid;

pre-sintering the formed body at a temperature of 1450° to 1750° C.; subjecting the pre-sintered body to hot isostatic pressing in an inert atmosphere at a temperature of 1000° to 2000° C. under a pressure of 1000 to 2000 atmospheres (gauge); and subjecting the obtained ceramic substrate to a polishing treatment, whereby the substrate has an average void diameter smaller than 1.0 μm and the number of voids per unit area is controlled to less than 10 per $8 \times 10^5$ μm².

14. A process as set forth in claim 13, wherein said isostatic pressing is carried out at a temperature of 1300° to 1800° C.

15. A process as set forth in claim 13, wherein the central line average roughness (Ra) of the ceramic substrate is smaller than 0.1 μm.

* * * * *